United States Patent Office 3,554,926
Patented Jan. 12, 1971

3,554,926
CATALYST FOR THE HYDRATION OF OLEFINS TO ALCOHOLS
Max Statman and Don S. Martin, Longview, Tex., assignors to Eastman Kodak Company, Rochester, N.Y., a corporation of New Jersey
No Drawing. Filed June 7, 1968, Ser. No. 735,178
Int. Cl. B01j *11/82*
U.S. Cl. 252—435
4 Claims

ABSTRACT OF THE DISCLOSURE

Catalyst for the hydration of olefins which is prepared by impregnating a silica-alumina support with phosphoric acid and heating the acid-impregnated support in the presence of an oxygen-containing gas at a temperature of about 220 to 240° C. for at least 8 hours. The support typically has an alumina content of about 10 to about 40 weight percent.

---

This invention relates to a catalyst which finds particular utility in the hydration of olefins. In a specific aspect this invention relates to a supported phosphoric acid catalyst possessing improved activity in the direct vapor phase hydration of olefins to alcohols and to a method for preparing such a catalyst.

The direct vapor phase hydration of olefins is well known in the art. In this process an olefin and steam are reacted in the presence of a catalyst at temperatures of 250–320° C. and under superatmospheric pressures. The most common catalyst employed is phosphoric acid deposited on a porous support such as diatomaceous earth, kieselguhr, and the like. Naturally-occurring diatomaceous earth has been widely preferred as the support for these catalysts. Other materials such as synthetically-produced silica, silica-alumina, alumina, zirconia, etc., have never shown catalytic activity approaching that of a diatomaceous earth. In the preparation of the catalyst, the support is impregnated with phosphoric acid and then dried. While the catalysts so prepared have been satisfactory, they suffer from a number of disadvantages. One disadvantage is the migration of the phosphoric acid, which is present as a liquid under reaction conditions, from the support in the direction of the process flow through the reactor. This migration of acid from the catalyst bed is particularly high during the start-up and initial operating periods. The acid migration not only causes rapid inactivation of the catalyst and reduced conversion rates but it also causes corrosion problems requiring the use of expensive equipment in the reaction apparatus. The loss of the acid reduces the activity of the catalyst and must be overcome by further addition of phosphoric acid or triethyl phosphate. Another problem encountered with catalysts of this type is the entrainment of fine particles, resulting from the disintegration of the catalyst support, in the reactor effluent. These fine particles, entrained by the migrating liquid acid, can cause fouling and plugging of the reaction system, thereby limiting the duration of reactor operation.

Another disadvantage of the prior art catalysts has been their inadequate mechanical strength. The structural properties of the catalyst support are measured by its resistance to a crushing force in terms of kilograms. This property, as used throughout the specification, is measured by the procedure described in U.S. Pat. 2,041,869. The olefin hydration catalysts prepared from the commercially available calcined silicious carriers, such as calcined diatomaceous earth exhibit crush strengths of 2 to 3 kilograms of force and under reaction conditions will exhibit shrinkages of up to 18% in volume with 15% being crushed to less than 20 mesh. These properties limit the duration of reactor runs and cause plugging. Various treatments of the acid-impregnated support have been suggested but none has proved entirely satisfactory.

It is accordingly an object of this invention to provide a catalyst for the direct vapor phase hydration of olefins which is more efficient over prolonged periods of operation. Another object is to provide a catalyst consisting of phosphoric acid adsorbed on a porous support which exhibits improved mechanical strength and acid permanence. Still another object is to provide an improvement in the process of directly hydrating olefins to alcohols. The nature of other objects of this invention will become apparent to those skilled in the art upon reading the description and examples to follow.

We have discovered that a silica-alumina support subjected to treatment through a unique series of steps provides an olefin hydration catalyst possessing high dimensional stability and resistance to crushing, superior acid permanence and improved efficiency. In accordance with the present invention a silica-alumina support having an alumina content of about 10 to 40% is impregnated with 60–85% phosphoric acid and the impregnated support is heated in the presence of an oxygen-containing gas at about 220° to 240° C. for at least about 8 hours. The resulting catalyst, even though made from phosphoric acid, exhibits no tendency for the phosphoric acid to migrate from the support. The activity, crush strength and shrinkage resistance of the catalyst is found to be unexpectedly superior to prior art catalysts including calcined diatomaceous earth subjected to the heat treatment steps of the invention. The structural strength of the finished catalyst is three to five times that of previously used catalyst atnd shrinkages of the catalyst are found to be less than 2% through evaluations. In view of the improved catalytic activity and production rates provided by the novel catalyst of the invention, the catalyst allows use of operating conditions which are not possible with other phosphoric acid catalysts, with resulting higher conversions per pass, much greater production rates per reactor and a considerable reduction in undesirable impurities. Also, since there is no acid migration from the catalyst there is no need to add phosphoric acid-containing materials during the reaction. Elimination of acid loss through migration lowers the corrosiveness of the reactor products allowing use of less expensive construction materials and methods of construction. The additional hardness and resistance to shrinking of the novel catalyst in turn extends the life of the catalyst and allows longer reactor runs.

The silica-alumina support treated in accordance with the method of the invention predominates in silica and contains about 10% to 40% by weight alumina. The alumina content of the silica-alumina support employed in the method of the present invention has been found to be important in the production of a phosphoric acid catalyst having the aforementioned advantages. As will be demonstrated in the examples silica-aluminas having an alumina content below about 10% or above about 40% by weight have been found unsuitable and do not provide phosphoric acid catalysts of the desired activity.

The synthetic silica-alumina supports of the invention will usually have a surface area of about 200 to above 750 square meters per gram, a pore volume of about 0.4 to above 2 cubic centimeters per gram and an initial crush strength of about 3.5 to 7. Higher or lower values of each parameter may be employed. Advantageously, the silica-alumina support has a surface area of about 300 to about 600 square meters per gram, a pore volume of 0.7 to 1.5 cubic centimeters per gram and a minimum initial crush strength of 5 kilograms of force. The silica-alumina can be calcined or uncalcined and can be used either in finely-divided form or as a macrosize particle formed, for instance, by extrusion pelleting, and other conventional means.

Our superior catalyst can be prepared by soaking the silica-alumina support in an excess of 60–85% phosphoric acid and, after draining off the excess acid, subjecting the acid impregnated support to heat treatment in the presence of an oxygen-containing gas such as air. No apparent reaction between the acid and the support is effected by the heat treating and we have not determined the nature of the reaction or transformation which the acid impregnated support undergoes during the heating in the presence of the oxygen-containing gas. However, as will be shown by the examples, some chemical or physical change does occur other than mere drying of the acid. Generally, maximum acid saturation of the catalyst support is attained by soaking the support in a 60–85% solution of phosphoric acid for about an hour. It is important that the temperature in the heating step be maintained between about 220 and 240° C. Temperatures below about 220° C. do not effect the desired change in the catalyst, while temperatures above 240° C. cause the phosphoric acid to convert to pyrophosphoric and polyphoric acids which are not as effective for catalyzing and hydration of olefins as is orthophosphoric acid and therefore should be avoided. The importance of the presence of air or other oxygen-containing gas during the heating of the acid-impregnated carrier is shown by the examples, which demonstrate that the absence of oxygen in this step results in a catalyst which does not have the improved properties of our catalyst. The period of heating at the temperatures prescribed above must be at least 8 hours and typically extends for about 30 hours.

The permanency of the phosphoric acid in our catalyst permits a ratio of olefin to steam in the reactor feed more favorable for the conversion of the olefin to the corresponding alcohol. In the past, the tendency of the phosphoric acid to migrate from the catalyst bed has required limiting the amount of water fed as steam to the reactor with the olefin in order to control the washing off of the phosphoric acid. As a result of this limitation on the amount of water in the reactor feed, the composition of reactants in the synthesis section has corresponded to low theoretical equilibrium conversion of olefin to alcohol, resulting in lower conversions per pass. Furthermore, a low molar ratio of steam to olefin results in the formation of the corresponding ether and favors the production of polyolefin oil. In order to decrease formation of these by-products, the olefin is normally fed to the reactor with a diluent such as methane in concentrations up to 40%. Although dilution of the olefin reduces by-product formation, it also significantly decreases the conversion of olefin to alcohol, and of course, reduces the overall production rate of the reactor. As is shown in the examples, the migration of phosphoric acid has been practically eliminated from our catalyst, permitting us to omit the diluent from the reactor feed. Other advantages attributable to the permanency of the phosphoric acid of our catalyst are improved product purity, reduction of corrosion problems, and prolonged operation without the addition of phosphoric acid containing materials to the catalyst bed.

Our catalyst is adaptable to the direct olefin hydration system illustrated and described in U.S. Pat. 2,773,910, although certain parts of that system may be replaced with less expensive materials or even eliminated because of the markedly reduced corrosion problems experienced in the use of our catalyst. Our catalyst can be used in such a system for the direct conversion of olefins having 2 to about 4 carbon atoms. For example, ethylene can be converted to ethanol, propylene to isopropanol, butene-1 or butene-2 to secondary butanol, and isobutylene can be converted to tertiary butanol.

The following examples will serve to illustrate the preparation and application of our novel catalyst and its comparison to catalysts prepared by known methods. The catalysts of Examples 1, 6 and 9 are representative of our invention.

EXAMPLE 1

A catalyst representative of those of our invention is prepared by the following series of steps. A sample of silica-alumina supporting material with the following properties:

Size—3/16" extrusions
Surface area—400 square meters per gram
Pore volume—1 cc. per gram
Silica as $SiO_2$—87 weight percent
Alumina as $Al_2O_3$—13 weight percent
Crush strength—5.5 kilograms is immersed without previous treatment into an excess of 75 percent phosphoric acid. This mixture is allowed to stand for one hour and then the excess acid is drained for 30 minutes. The impregnated support is then placed in a tube and air passed over the support. The tube is heated to 230° C. for 18 hours. Upon cooling, the catalyst is ready for use. The crush strength as measured on the treated catalyst is 9.6 kilograms.

Into a suitable reaction vessel 500 ml. of the catalyst is loaded. A mixture of three parts ethylene, two parts methane, and one part water is passed through the vessel at 270° C., 1200 p.s.i.g., at a contact time of 33 seconds. Table 1 gives the detailed results of this run. As noted from this table, the conversion of ethylene to ethyl alcohol at the end of the first day is 4.6 percent and at the end of the fifth day is 4.5 percent. The total shrinkage is 1 percent.

EXAMPLE 2

To illustrate the importance of heat treating the acid-impregnated support, a catalyst is prepared by impregnating a support such as described in Example 1 with 75 percent phosphoric acid. Upon draining the excess acid, the impregnated support is ready for use. The crush strength of this catalyst is 3.8 kilograms.

The catalyst is tested in a manner described in Example 1. From Table 1 it can be seen that the catalyst of our invention is superior to this catalyst in every way. Note the high acid migration as seen in the phosphate content.

EXAMPLE 3

In order to demonstrate that the effectiveness of our catalyst is not merely the result of a heating operation, a catalyst support such as described in Example 1 is impregnated with 75 percent phosphoric acid. After the excess acid is removed, the treated support is placed in a furnace tube such as described in Example 1. The catalyst is exposed to methane instead of air for 18 hours at 230° C. The crush strength of this catalyst is 6.0 kilograms.

The catalyst is tested in a manner described in Example 1. The results are reported in Table 1.

EXAMPLE 4

To illustrate the advantages of our synthetic silica-alumina supports over naturally-occurring diatomaceous earth supports, a catalyst is prepared by the following series of steps. A sample of calcined diatomaceous earth with the following properties:

Size—6–10 mesh
Surface area—12 square meters per gram
Crush strength—2.2 kilograms
$R_2O_3$ content—5 percent
$Fe_2O_3$ content—1.4 percent is immersed without previous treatment into an excess of 75 percent phosphoric acid. This mixture is allowed to stand for one hour and then the excess acid is drained for 30 minutes. The impregnated support is then placed in a tube and air is passed over the support. The tube and the air are heated to 230° C. for 18 hours. Upon cooling the catalyst is ready for use. The crush strength as measured on the treated catalyst is 4.7 kilograms.

The catalyst is tested in a manner described in Example 1. This shows the effect of our treatment upon a calcined diatomaceous earth support, demonstrating that the presence of silica alone does not give the full benefits of our invention.

EXAMPLE 5

To illustrate the advantages of our synthetic silica-alumina supports over standard commercial hydration catalysts, a catalyst is prepared by impregnating a support such as described in Example 4 with 75 percent phosphoric acid. Upon draining the excess acid the impregnated support is ready for use. The crush strength of this catalyst is 2.1 kilograms.

The catalyst is tested in a manner described in Example 1. This shows how a standard catalyst performs under these normal operating conditions. This catalyst is similar to catalysts now being used for the commercial production of ethyl alcohol by the vapor phase hydration of ethylene.

TABLE 1

| | Example | | | | |
|---|---|---|---|---|---|
| | 1 | 2 | 3 | | 5 |
| Temperature, ° C | 270 | 270 | 270 | 270 | 270 |
| Pressure, p.s.i.g. | 1,200 | 1,200 | 1,200 | 1,200 | 1,200 |
| Percent ethylene in feed gas | 60 | 60 | 60 | 60 | 60 |
| Mole ratio ethylene:water | 3:1 | 3:1 | 3:1 | 3:1 | 3:1 |
| Contact time, seconds | 33 | 32 | 34 | 33 | 34 |
| Percent conversions: | | | | | |
| 1st day | 4.6 | 4.1 | 4.3 | 4.3 | 4.14 |
| 2nd day | 4.5 | 3.0 | 4.2 | 4.13 | 3.33 |
| 3rd day | 4.5 | 1.5 | 4.2 | 4.2 | 3.16 |
| 4th day | 4.55 | 0.1 | 4.1 | 4.24 | 2.53 |
| 5th day | 4.5 | | 4.0 | 4.2 | 0.5 |
| Crude product: | | | | | |
| Oil, p.p.m. | <0.1 | <0.1 | <0.1 | <0.1 | 0.5 |
| Ether, percent | 0.04 | 0.07 | 0.06 | 0.05 | 0.16 |
| Phosphate, p.p.m. | 15 | 1,800 | 40 | 20 | 1,200 |
| Crush strength, kg. | 9.6 | 3.8 | 6.0 | 4.7 | 2.1 |
| Percent, shrinkage | <1.0 | 1.2 | 1.1 | 1.5 | 18 |

EXAMPLE 6

In this run a catalyst of our invention, prepared in the manner described in Example 1, is tested at conditions which would result in greater alcohol production per unit reactor. Ethylene without diluent is used. The production rate for this test is 21.6 pounds of ethyl alcohol per hour per cubic foot of catalyst. In Example 1 the production rate is 9.3 pounds per hour per cubic foot of catalyst. See Table 2 for data.

EXAMPLE 7

To further illustrate the advantages of our catalysts, a catalyst from Example 2 is tested in a manner described in Example 6. The acid migration from this catalyst is so severe that the run is shut off at the end of 12 hours of operation. See Table 2.

EXAMPLE 8

In order to demonstrate the superiority of our catalysts over the standard commercial hydration catalysts, a catalyst from Example 5 is tested in a manner described in Example 6. The rate of acid migration from this catalyst is so severe that the run is shut off at the end of 16 hours of operation. Once again, this is a "standard" type catalyst. See Table 2 for data.

TABLE 2

| | Example | | |
|---|---|---|---|
| | 6 | 7 | 8 |
| Catalyst | (¹) | (²) | (³) |
| Temperature, ° C | 300 | 300 | 300 |
| Pressure, p.s.i.g. | 1,200 | 1,200 | 1,200 |
| Percent ethylene used | 100 | 100 | 100 |
| Mole ratio ethylene:water | 1.4:1 | 1.4:1 | 1.4:1 |
| Contact time, seconds | 34 | 34 | 34 |
| Catalyst volume, ml. | 500 | 500 | 500 |
| Percent, conversions: | | | |
| 1st day | 6.0 | 1.3 | 1.2 |
| 10th day | 5.9 | | |
| 20th day | 6.0 | | |
| 30th day | 5.9 | | |
| Crude product: | | | |
| Percent ether | 0.08 | 0.10 | 0.15 |
| Percent acetaldehyde | 0.02 | 0.02 | 0.03 |
| Oil, p.p.m. | <0.1 | 0.2 | 0.3 |
| Phosphates, p.p.m. | 15 | 8,000 | 7,000 |

¹ Example 1.
² Example 2.
³ Example 5.

EXAMPLE 9

Using a catalyst of the invention, prepared in the manner described in Example 1, a test is made under the following conditions. Ethylene, one part, and water, one part, are passed over this catalyst at 1200 p.s.i.g., 300° C., and at a contact time of 45 seconds. The conversion of ethylene to ethyl alcohol is 6.9 percent. The crude product contains less than 0.1 p.p.m. oil and less than 0.1 percent diethyl ether.

EXAMPLES 10–14

These examples are made with assorted catalyst supports which are prepared and tested in the manner described in Example 1.

| | Support | Percent, conversion |
|---|---|---|
| Example: | | |
| 10 | 95 percent silica, 5 percent alumina | 3.9 |
| 11 | 50 percent silica, 50 percent alumina | 2.0 |
| 12 | Silicon carbide 4–6 mesh | 1.5 |
| 13 | Activated carbon | 1.7 |
| 14 | Zirconia | 2.3 |

These examples demonstrate that other supports including silica-alumina supports having alumina contents outside the range of about 10%–40% do not provide catalysts having the activity of the catalyst of the present invention.

Although the invention has been described in considerable detail with particular reference to certain preferred embodiments thereof, variations and modifications can be effected within the spirit and scope of the invention as described hereinbefore and as defined in the appended claims.

We claim:

1. A method of preparing a catalyst which comprises impregnating with 60 to 85% phosphoric acid a silica-alumina support having an alumina content of about 10 to 40% by weight and heating the acid-impregnated silica-alumina support in the presence of an oxygen-containing gas at a temperature of about 220 to 240° C. for at least 8 hours.

2. The catalyst prepared by the method of claim 1.

3. The method of claim 1 wherein the silica-alumina support has a surface area of at least 300 square meters per gram, a pore volume of at least 0.7 cubic centimeter per gram and an initial crush strength of 5 kilograms.

4. The method of claim 1 wherein said impregnation is effected by soaking said support in an excess of 60 to 85% phosphoric acid.

References Cited

UNITED STATES PATENTS

| 3,006,970 | 10/1961 | Beuther et al. | 260—641 |
| 3,311,568 | 3/1967 | Klimenko | 252—435 |
| 3,459,678 | 8/1969 | Hagemeyer et al. | 252—435 |

PATRICK P. GARYIN, Primary Examiner

U.S. Cl. X.R.

260—641